US009613731B2

(12) United States Patent
Feldmeier

(10) Patent No.: US 9,613,731 B2
(45) Date of Patent: Apr. 4, 2017

(54) CABLE HAVING ELECTRICAL SHIELDING AND SEAL

(71) Applicant: Tyco Electronics AMP GmbH, Bensheim (DE)

(72) Inventor: Guenter Feldmeier, Lorsch (DE)

(73) Assignee: TE Connectivity Germany GmbH, Bensheim (DE)

(*) Notice: Subject to any disclaimer, the term of this patent is extended or adjusted under 35 U.S.C. 154(b) by 0 days.

(21) Appl. No.: 14/383,566

(22) PCT Filed: Feb. 27, 2013

(86) PCT No.: PCT/EP2013/053871
§ 371 (c)(1),
(2) Date: Sep. 7, 2014

(87) PCT Pub. No.: WO2013/131787
PCT Pub. Date: Sep. 12, 2013

(65) Prior Publication Data
US 2015/0096782 A1 Apr. 9, 2015

(30) Foreign Application Priority Data
Mar. 8, 2012 (DE) ........................ 10 2012 203 638

(51) Int. Cl.
*H02G 15/02* (2006.01)
*H01B 7/18* (2006.01)
(Continued)

(52) U.S. Cl.
CPC ......... *H01B 7/1855* (2013.01); *H01B 7/1895* (2013.01); *H01B 7/2825* (2013.01); *H01B 7/226* (2013.01); *H01B 11/10* (2013.01)

(58) Field of Classification Search
USPC .............. 174/74 R, 78, 84 R, 87, 88, 102 R, 174/102 SC, 110 R, 110 SC
See application file for complete search history.

(56) References Cited

U.S. PATENT DOCUMENTS 2,397,082 A * 3/1946 Barker .................. H01B 9/027 106/241
2,754,352 A * 7/1956 Connell ................ H01B 9/023 174/102 SC
(Continued)

FOREIGN PATENT DOCUMENTS

CA 2 461 110 A1 1/1925
DE 21 19 573 A1 11/1972
(Continued)

OTHER PUBLICATIONS

International Search Report and Written Opinion issued by the European Patent Office, Rijswijk, Netherlands, dated May 28, 2013, for International Application No. PCT/EP2013/053871; 9 pages.
(Continued)

*Primary Examiner* — William H Mayo, III
(74) *Attorney, Agent, or Firm* — Faegre Baker Daniels LLP

(57) ABSTRACT

The invention relates to a cable (1) having at least one electrical line (2), the electrical line (2) being surrounded by an electrically conductive sheath (5), the sheath (5) being formed from an electrically conductive and resilient sealing material.

14 Claims, 3 Drawing Sheets

(51) Int. Cl.
*H01B 7/282* (2006.01)
*H01B 7/22* (2006.01)
*H01B 11/10* (2006.01)

(56) References Cited

U.S. PATENT DOCUMENTS

| | | | | | |
|---|---|---|---|---|---|
| 2,759,991 | A * | 8/1956 | Rheiner | H01B 3/002 | 174/113 R |
| 2,834,828 | A * | 5/1958 | Ebel | H01B 9/023 | 156/56 |
| 3,259,688 | A * | 7/1966 | Towne | H01B 9/027 | 174/102 R |
| 3,333,049 | A * | 7/1967 | Humphrey | H01B 7/0036 | 174/102 SC |
| 3,496,281 | A * | 2/1970 | McMahon | H01B 7/0241 | 174/102 R |
| 3,558,799 | A * | 1/1971 | Lee | H01R 4/10 | 174/73.1 |
| 3,748,369 | A * | 7/1973 | Durakis | H01B 13/26 | 156/56 |
| 3,890,662 | A * | 6/1975 | Roberts | B63C 9/1255 | 141/383 |
| 4,678,699 | A * | 7/1987 | Kritchevsky | B29C 51/145 | 174/393 |
| 6,333,462 | B1 * | 12/2001 | Quaggia | H02G 15/068 | 174/73.1 |
| 6,837,741 | B2 * | 1/2005 | Kuwahara | H01R 4/023 | 439/497 |
| 2005/0006126 | A1 * | 1/2005 | Aisenbrey | B29C 45/0013 | 174/68.1 |
| 2010/0132973 | A1 * | 6/2010 | Fitz | H01B 9/02 | 174/102 R |

FOREIGN PATENT DOCUMENTS

| | | | |
|---|---|---|---|
| DE | 34 38 660 | A1 | 4/1986 |
| DE | 201 21 335 | U1 | 2/2001 |
| DE | 103 54 284 | A1 | 6/2004 |
| GB | 2 229 313 | A | 9/1990 |
| GB | 2 355 335 | A | 4/2001 |
| WO | WO 00/74080 | A1 | 12/2000 |

OTHER PUBLICATIONS

Search Report Office Action issued by the German Patent and Trademark Office, Munich, Germany, dated Oct. 2, 2012, for German Patent Application No. 10 2012 203 638.5; 10 pages.

International Preliminary Report on Patentability issued by the International Bureau of WIPO, Geneva, Switzerland, dated Sep. 9, 2014 for International Application No. PCT/EP/2013/053871; 8 pages.

* cited by examiner

CABLE HAVING ELECTRICAL SHIELDING AND SEAL

The invention relates to a cable surrounded by an electrically conductive sheath.

BACKGROUND

In the prior art, there are known electrical cables in which the electrical lines are provided with an electrical shielding in the form of a wire mesh or a film.

An object of the invention is to provide an improved cable.

SUMMARY

The object of the invention is achieved with a cable according the disclosed embodiment.

Other advantageous embodiments of the cable are set out in the dependent claims.

The cable has the advantage that both electrical shielding of the electrical line is achieved and, in addition, improved mechanical protection of the electrical line is achieved. This is achieved by an electrically conductive sheath being provided as a shielding which is formed from an electrically conductive and resilient sealing material. In this manner, improved protection against dust, fluids such as, for example, water, oil or petrol, or against mechanical damage can be achieved.

In another embodiment, the electrically conductive sheath is surrounded by another insulating sheath. Consequently, another material, in particular a harder metal, can be selected for the insulating sheath so that additional mechanical protection is provided.

In another embodiment, the sheath is produced from an admixture of a resilient material and an electrically conductive material. The sheath can thus be produced in a simple and cost-effective manner.

In another embodiment, the sheath is produced from an admixture of a resilient material and electrically conductive particles. With this embodiment, good electrical conductivity can be achieved.

In another embodiment, the resilient material is an electrically conductive silica gel or a dry silica gel. Silica gel is suitable for constituting the electrical conductivity and at the same time for constituting the mechanical protective function.

In another embodiment, the electrically conductive material is constructed in the form of carbon black and/or graphite. The use of carbon black or graphite enables simple and cost-effective production of the electrically conductive resilient material.

In another embodiment, the electrically conductive particles are constructed in the form of metal particles, electrically conductive nanoparticles and/or graphite particles, in particular graphite tubes. Using the particles described, good electrical conductivity is achieved with at the same time good resilient properties of the sheath.

In another embodiment, an electrically conductive particle is constructed in the form of a particle having an electrically conductive layer. The particles can thereby be produced in a cost-effective manner. In addition, the weight is reduced in comparison with purely metal particles.

In another embodiment, the sheath is constructed as a sleeve, in particular as an extruded sleeve. This embodiment affords the advantage that the sheath can be produced in a simple and cost-effective manner and can in particular be applied directly to the electrical line by means of an extrusion method. Reliable covering and good sealing of the electrical line are thereby achieved.

In another embodiment, the sheath is wound in the form of a strip around the insulating layer of the electrical line, the strip preferably being wound in a layer and lateral faces of the strip preferably being in mutual abutment in a sealing manner, and a sealed sheath layer consequently being obtained. The construction of the sheath in the form of a wound strip involves cost-effective and simple production. The strip may be produced as a preliminary product and can be wound on various electrical lines. A simple and cost-effective production of the cable is thereby possible. In addition, using the wound strip, individual portions of the electrical line, in particular ends of the electrical line, may be provided with a resilient, electrically conductive sheath.

In another embodiment, the sheath is constructed in the form of a tape which is wound to form a slotted sleeve. This embodiment affords the advantage that, using the tape, sleeves with different diameters can be produced in a simple manner. This form is particularly advantageous when, for example, only portions of the electrical line, for example, end portions, are intended to be provided with an electrically conductive resilient sheath.

In another embodiment, the cable is connected to a housing, the sheath being in abutment with a receiving member of the housing in a sealing and electrically conductive manner, in particular being in abutment axially and/or radially in a sealing and electrically conductive manner. A sealing is thereby achieved between the housing and the electrical line. Consequently, good protection of the electrical line with respect to the infiltration of dust or fluids is enabled.

BRIEF DESCRIPTION OF THE DRAWINGS

The invention is explained in greater detail below with reference to the Figures, in which.

DETAILED DESCRIPTION

Figure 1:
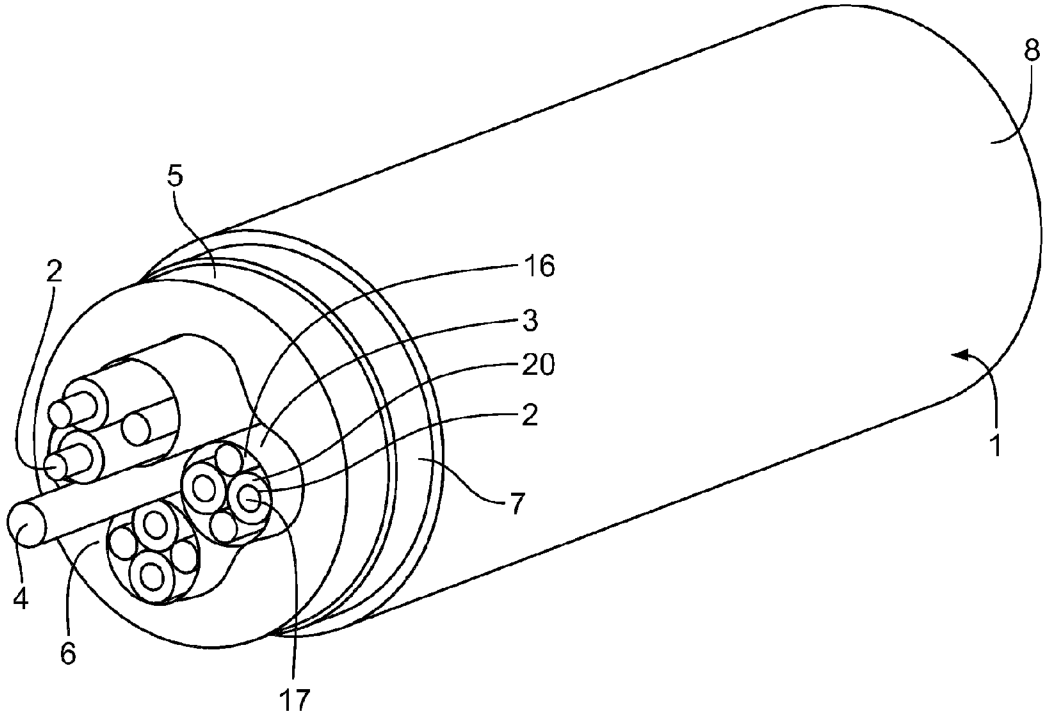
FIG. 1 shows a first embodiment of a cable.

FIG. 1 is a perspective cross-section of a cable 1 which has a plurality of electrical lines 2. In the embodiment illustrated, four pairs of electrical lines 2 are provided, two electrical lines 2 being surrounded by a protective sheath 3 in each case. The protective sheath 3 may be constructed in the form of a shielding sheath, in particular an electrically conductive film. Filling elements 16 are further provided in the protective sheath 3. In addition, a sheath wire 4 is provided. The electrical line 2 has an electrical conductor 17 which is surrounded by an electrical insulation layer 20. The electrical lines 2 having the protective sheaths 3 are surrounded by a sheath 5 which is formed by an electrically conductive and resilient sealing material. In the embodiment illustrated, the cover 5 is constructed in a sleeve-like manner and has a recess 6 which constitutes in cross-section a square which is rounded in corner regions. The outer contour of the sheath 5 is cylindrical. The sheath 5 is surrounded by a film 7 which may be constructed, for example, in an electrically conductive manner. In place of the film 7, an electrically conductive mesh may also be provided. Depending on the embodiment selected, it is also possible to dispense with the film 7. The film 7 is in turn surrounded by another sheath 8. The outer sheath 8 constitutes the outer covering of the cable 1 and is preferably produced from an electrically insulating material.

In place of the plurality of electrical lines 2, there may also be provided only a single electrical line 2 which is surrounded by a sheath 5. Consequently, the shape of the cross-section of the recess 6 of the sheath 5 may also vary depending on the shape and number of the electrical lines 2. For example, a plurality of electrical lines 2 in the form of a flat strip cable may also be surrounded by the sheath 5, whose recess 6 is in the form of a rounded flat rectangle. Both the sheath 5 and the outer sheath 8 may, for example, be extruded on the electrical lines using an extrusion method. For example, if the film 7 is dispensed with, the sheath 5 and the outer sheath 8 may be applied together in the form of a tandem extrusion or co-extrusion method.

Figure 2:
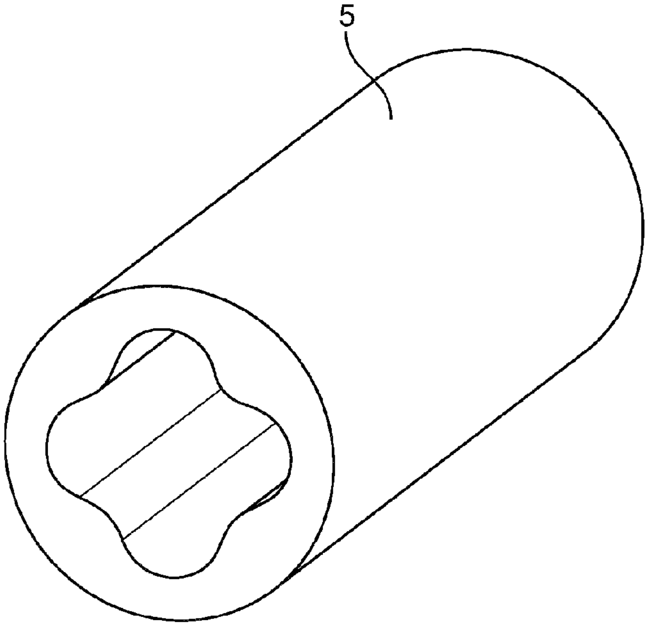
FIG. 2 shows the electrically conductive sheath in the form of a sleeve.

FIG. 2 is a perspective view of the sheath 5 of the cable 1 of FIG. 1. The sheath 5 is produced, for example, from a mixture of a resilient material and an electrically conductive material and/or electrically conductive particles. The term resilient material is intended to be understood to refer to purely resilient materials and viscoelastic materials, that is to say, partially resilient and partially viscous materials. The resilient material may, for example, be formed from a thermoplastic material, a thermoplastic gel, a gel based on polyurethane, a polymer, a silicone rubber, a silicone elastomer, a silica gel, in particular a dry silica gel.

The electrically conductive material may, for example, be carbon black and/or graphite. The electrically conductive particles may, for example, be constructed in the form of metal particles, electrically conductive nanoparticles and/or graphite particles, in particular graphite tubes.

In another embodiment, an electrically conductive particle is constructed in the form of a particle having an electrically conductive layer. For example, a particle may comprise an electrically insulating material, for example, a ceramic or mineral material, whose surface is at least partially, preferably completely, provided with an electrically conductive layer, for example, a metal layer. For example, silver and/or gold and/or palladium can be used as the metal.

The electrically conductive material has, for example, a specific electrical volume resistance of up to 100 mΩcm.

Figure 3:
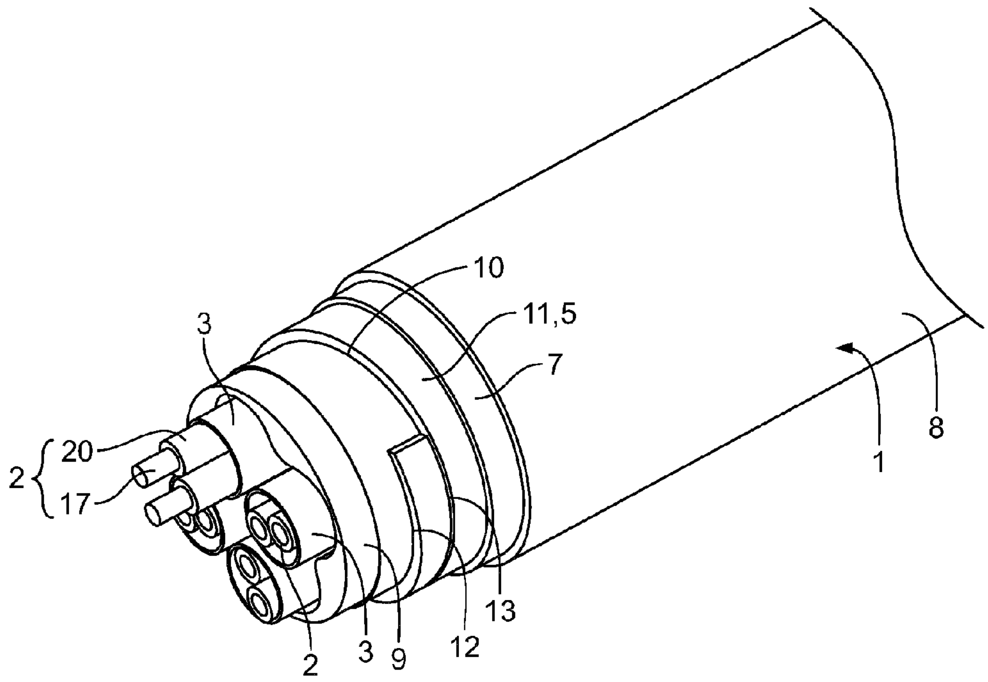
FIG. 3 shows a second embodiment of the cable.

FIG. 3 shows the embodiment of a cable 1, in which the electrical lines 2 having the protective sheaths or shielding sheaths 3 are surrounded by an inner sheath 9. The inner sheath 9 may be constructed from a polymer. Depending on the embodiment selected, the inner sheath 9 may also be dispensed with. There is applied to the inner sheath 9 another film 10 which is, for example, electrically conductive. In place of the additional film, an electrically conductive mesh may also be provided. The electrically conductive sheath 5 is applied to the additional film 10 in the form of a wound electrically conductive strip 11. The strip 11 is in turn surrounded by an optional film 7 to which the outer sheath 8 is applied. In the embodiment illustrated, the inner sheath 9 has a recess which is constructed in accordance with the recess 6 of the sheath 5 of FIG. 1 in order to be able to receive the electrical lines 2 in a precisely fitting manner. The outer contour of the inner sheath 9 is of cylindrical form. The sheath 5, which is produced from the resilient and electrically conductive material, is constructed in the form of the wound strip 11.

Figure 4:
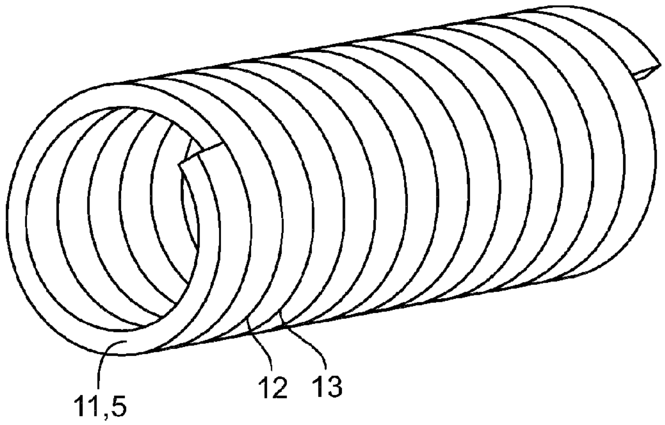
FIG. 4 shows the construction of the sheath in the form of a wound strip.

FIG. 4 is a perspective view of the sheath 5 as a wound strip. In the illustrated embodiment, the strip 11 is wound only in one plane, lateral faces 12, 13 of the strip 11 touching each other. The lateral faces 12, 13 preferably abut each other in a sealing manner and in electrically conductive contact. In this manner, there is provided a sheath 5 which seals the inner recess 6 thereof, which has a circular cross-section in the embodiment illustrated, against dust and moisture and constitutes a continuously electrically conductive sheath. The construction of the sheath 5 in the form of the wound strip 11 affords the advantage that the production is simple and cost-effective. In addition, lines with different diameters can be wound with one strip. Consequently, individual adjustment of the strip to the individual diameter of the line is not required. In another embodiment, the strip 11 can also be wound in a plurality of layers around the electrical line(s). A multi-layer sheath is thereby achieved.

Figure 5:
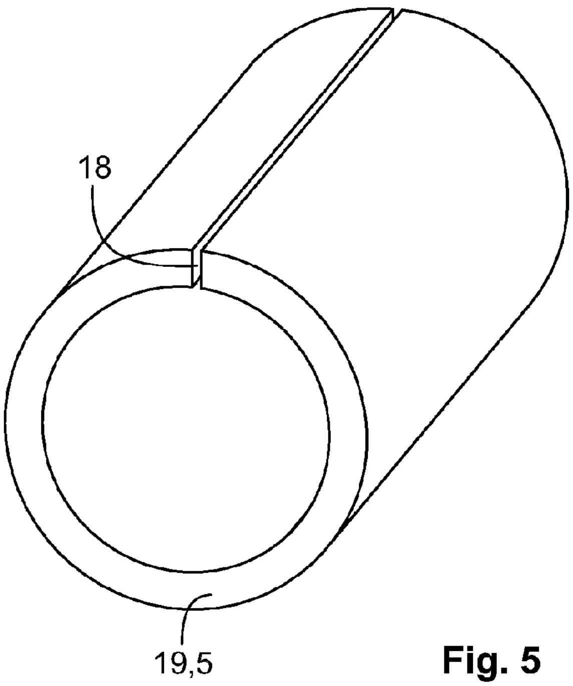
FIG. 5 shows the embodiment of the sheath in the form of a slotted sleeve.

FIG. 5 shows another embodiment of the sheath 5 which is constructed in the form of an electrically conductive sleeve 19 which has a slot 18 in the longitudinal direction, the opposing lateral faces of the sleeve 19 along the slot 18 being in contact and both sealing and bridging the slot 18 in an electrically conductive manner. The sleeve is produced using a tape, that is to say, a strip, in particular a strip which is adhesive at one side and which is in the form of a slotted sleeve. This embodiment has the advantage that, using the tape, sleeves 19 with different diameters can be produced in a rapid and simple manner.

Figure 6:
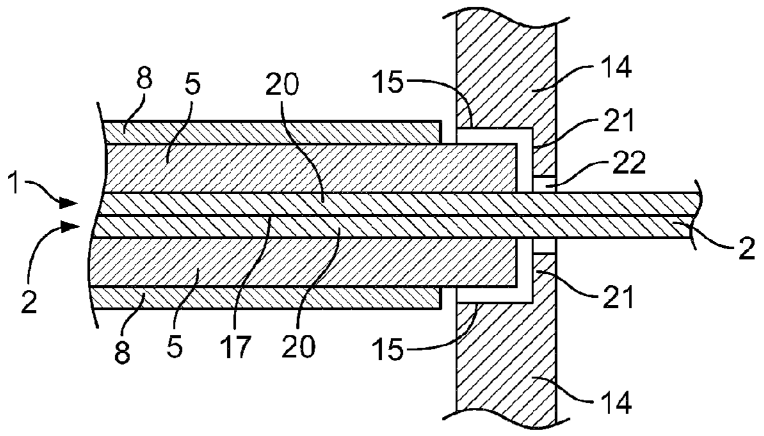
FIG. 6 shows a cable which is connected to a housing.

FIG. 6 shows another embodiment of the invention which is illustrated schematically. In this embodiment, the cable 5 is guided on a housing 14. The housing 14 has a first abutment face 15 on which the sheath 5 is pressed in a sealing manner with the radial periphery thereof. In addition, there is formed on the housing 14 a second abutment face 21 against which the sheath 5 is in abutment in an axially sealing manner. Consequently, on the one hand, an access opening to the housing 14 is sealed. In addition, the inner space of the sheath 5 is also sealed against the infiltration of moisture and/or dirt. Depending on the selected embodiment, only one abutment face may also be provided.

Depending on the embodiment selected, the abutment face 15 may also have other forms. In the embodiment illustrated, the first and second abutment face 15, 21 are constructed in the form of annular faces which abut a cylindrical outer face of the sheath 5 or a planar annular face of the sheath 5. There are illustrated by way of example in the sheath 5 an electrically conductive particle 38 and a particle 39 which is provided with an electrically conductive layer 40. For example, the particle 39 may comprise an electrically insulating material, for example, a ceramic or mineral material, whose surface is at least partially, preferably completely, provided with an electrically conductive layer 40, for example, a metal layer. For example, silver and/or gold and/or palladium can be used as the metal.

The electrical line 2 is guided through an opening 22 of the housing 14. The housing 14 may constitute a connector housing, a connection socket or any other type of housing.

Figure 7:
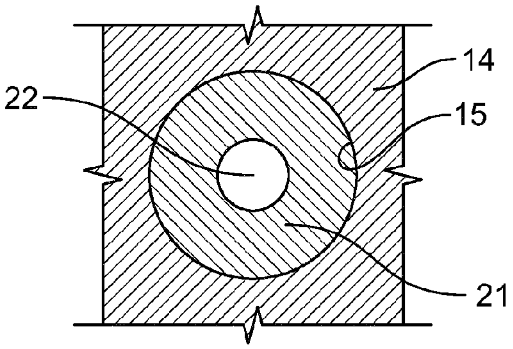
FIG. 7 is a view of the additional housing.

FIG. 7 is a view of the other housing 14 having the opening 22, the first and the second abutment face 15, 21.

Depending on the desired conductivity, the electrically conductive and resilient material has, for example, a proportion of from 20 to 30% of the conductive material and/or from 20 to 30% of the conductive particles. The production of the electrically conductive purely resilient material and/or a viscoelastic material is carried out by stirring and mixing the electrically conductive material or the electrically conductive particles in a fluid resilient material.

After the stirring, the required shapes and hardening are produced.

The resilient material may, for example, be produced from an oil containing thermoplastic gel or from a dry silica gel, in particular a dry thermally hardened plastics material, in particular silica gel. Furthermore, the resilient material may be produced from a polyurethane gel. A dry silica gel dispenses with a separate solvent or a separate softening agent. The resilient and electrically conductive material may have a hardness between 26 and 53 Shore 000 hardness. In addition, the resilient, electrically conductive material may have a resilience of from 4 to 60% between the original size and a compressed size. The viscoelastic material may have a hardness of between 150 and 500 grammes.

Silica gels such as, for example, silicone rubbers, are masses which can be converted into the resilient state and which contain poly(organo)siloxanes which have groups which are accessible for cross-linking reactions. These include primarily hydrogen atoms, hydroxy groups and vinyl groups which are located at the chain ends but which may also be incorporated in the chain. Silicone rubbers contain reinforcing materials and filler materials whose type and quantity significantly influence the mechanical and chemical behaviour of the silicone elastomers produced by the cross-linking.

A differentiation is made in accordance with the necessary cross-linking temperature between cold cross-linking (RTV) and hot cross-linking (HTV) silicone rubbers (RTV=cross-linking at ambient temperature, HTV=cross-linking at high temperature). HTV silicone rubbers are plastically deformable materials. They very often contain organic peroxides for the cross-linking. The elastomers which are produced from them owing to the cross-linking at high temperature are heat-resistant products which are resilient between −40 and 250° C. and which are used, for example, as high-quality sealing, damping, electrical insulation components, cable coatings and the like.

Another cross-linking mechanism involves an addition, which is generally catalysed by precious metal compounds, of Si—H-groups to silicon-bound vinyl groups, which are both incorporated in the polymer chains or at the end thereof. The silicone rubber components which, in contrast to the HTV rubbers described above, have a lower viscosity and can consequently be pumped, are mixed and metered with suitable mixing and metering machines and usually processed in injection moulding machines. This technology enables high cycle rates owing to the short duration of the cross-linking of the rubbers.

In the case of RTV silicone rubbers, it is possible to differentiate between single and two-component systems. The first group (RTV 1) cross-links at ambient temperature under the influence of air humidity, the cross-linking being carried out by means of condensation of SiOH groups, with Si—O bonds being formed. The Si—OH groups are formed by means of hydrolysis of SiX groups of a species resulting in an intermediate manner from a polymer having terminal OH groups and a so-called cross-linking agent R—SiX3 (X=—O—CO—CH3, —NHR). In the case of two-component rubbers (RTV-2), for example, admixtures of silicic acid esters (for example, ethyl silicate) and organotin compounds are used as cross-linking agents, the formation of an Si—O—Si bridge from Si—OR and Si—OH being carried out by means of alcohol separation as a cross-linking reaction.

The invention claimed is:

1. An arrangement with a cable and a housing, the cable having at least one electrical line, wherein the electrical line is surrounded by an electrically conductive sheath, the sheath being formed from an electrically conductive and resilient sealing material, wherein the cable is connected to the housing, the sheath being in abutment with an abutment face of the housing in a sealing and electrically conductive manner, in abutment axially and/or radially in a sealing and electrically conductive manner.

2. An arrangement according to claim 1, wherein the electrically conductive and resilient sealing material is constructed in a purely resilient and/or viscoelastic manner.

3. An arrangement according to claim 1, wherein the electrically conductive sheath is surrounded by an electrically insulating outer sheath.

4. An arrangement according to claim 1, wherein the sheath is produced from an admixture of a resilient material and an electrically conductive material.

5. An arrangement according to claim 4, wherein the electrically conductive material has carbon black and/or graphite.

6. An arrangement according to claim 1, wherein the sheath is produced from an admixture of a resilient material and electrically conductive particles.

7. An arrangement according to claim 6, wherein the electrically conductive particles are constructed in the form of metal particles, electrically conductive nanoparticles and/or graphite particles.

8. An arrangement according to claim 7, wherein the electrically conductive particles are constructed in the form of graphite tubes.

9. An arrangement according to claim 6, wherein an electrically conductive particle is constructed in the form of a particle having an electrically conductive layer.

10. An arrangement according to claim 1, wherein the sheath has an electrically conductive silica gel and/or a dry silica gel.

11. An arrangement according to claim 1, wherein the sheath is constructed as a sleeve.

12. An arrangement according to claim 11, wherein the sheath is constructed as an extruded sleeve.

13. An arrangement according to claim 1, wherein the sheath is constructed in the form of a strip which is wound around the electrical line, the strip in particular being wound in a layer and lateral faces of the strip being in mutual abutment in a sealing and electrically conductive manner.

14. An arrangement according to claim 1, wherein the sheath is constructed in the form of a tape, which is shaped to form a slotted sleeve and the mutually facing lateral faces of the sleeve are in mutual abutment in a sealing and electrically conductive manner.

* * * * *